July 16, 1968  F. R. GRUNER ET AL  3,392,841
FILTER
Filed Aug. 9, 1965
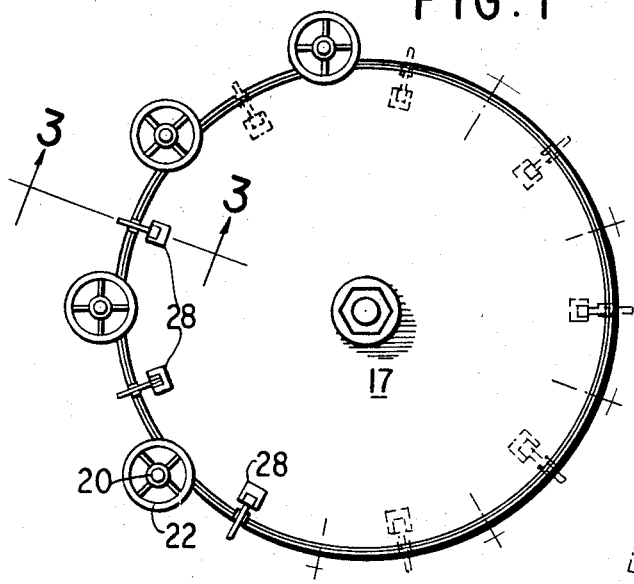
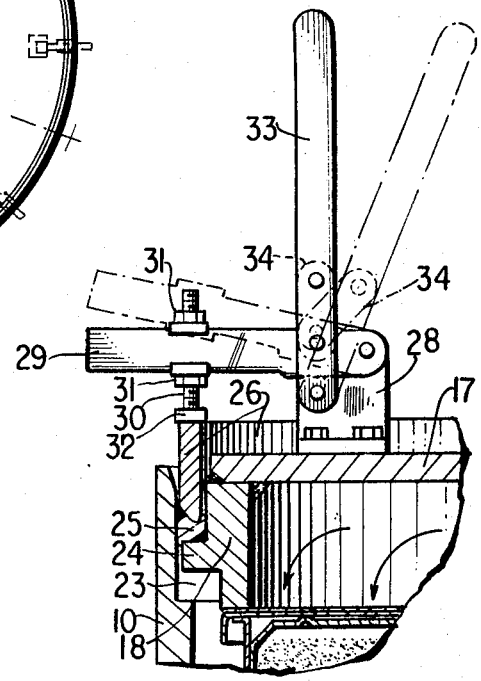
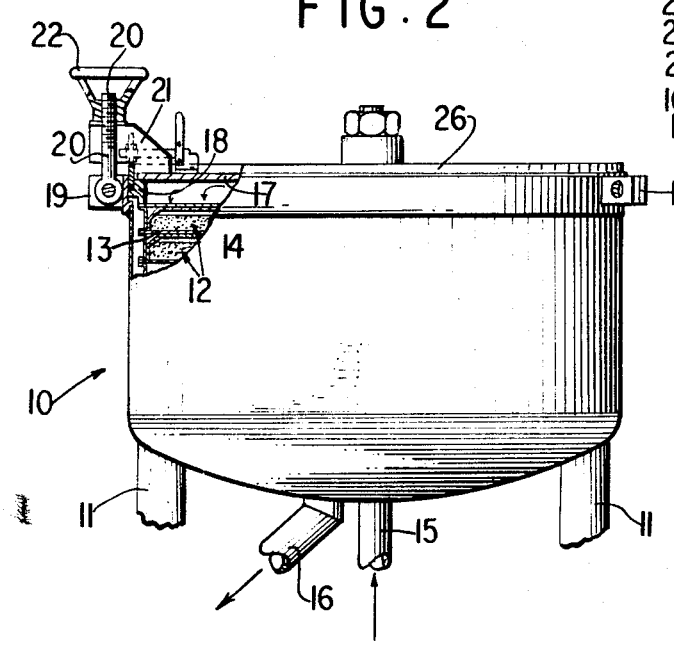
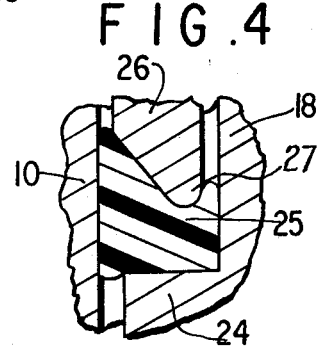
INVENTORS
FREDERICK R. GRUNER
KENNETH A. ANDERSON
BY
Robertson Smythe Bryan & Famulee
ATTORNEYS 3,392,841
FILTER
Frederick R. Gruner, Moline, and Kenneth A. Anderson, Silvis, Ill., assignors to Ametek, Inc., New York, N.Y., a corporation of Delaware
Filed Aug. 9, 1965, Ser. No. 478,179
5 Claims. (Cl. 210—347)

ABSTRACT OF THE DISCLOSURE

A large capacity plate filter having a high pressure seal between the tank lid and tank side wall formed by a gasket seated on a radial flange of a skirt which rests on the filter plates in the tank. The gasket being forced against the flange by a clamping ring.

---

This invention relates to large capacity plate filters and particularly to an improved sealing device for such filters.

Large capacity plate filters are usually provided with an open ended tank or tub arrangement in which a stack of filter plates is enclosed. Generally there is an inlet centrally disposed at the bottom of the tank, and the liquid to be filtered passes up through a central perforated tube, thence outwardly between the plates and axially through the filter plates, and it then gravitates to the bottom of the tank where it is withdrawn through an outlet.

The open top of such a filter is usually closed by a circular plate that is rigidly clamped to the tank. When such filters are subjected to substantial pressures, by virtue of their size, the force acting on the removable cover is very great, causing leakage of the filtrate past the cover seal.

The principal object of the present invention is to provide a large capacity plate filter that will not leak when substantial pressures within the filter are encountered.

Another object of the invention is to provide such a plate filter including a unique sealing means between the cover and the filter tank, which sealing means is released before the cover is removed in order to prolong the life of the sealing medium.

Still another object of the invention is to provide such a filter in which the cover includes a peripheral flange, the free edge of which contacts a sealing gasket, and which edge is contoured in a manner to cooperate with the gasket so as to ensure a tight seal regardless of the force exerted on the cover by the pressure within the filter.

In one aspect of the invention, a large capacity plate filter may comprise a tank of generally tub shape having an inlet centrally of its bottom that is connected to a centrally disposed perforated pipe. A series of filter plates with spacing means are stacked inside the tank with the central pipe extending through their centers and with the perforations of the pipe registering with the top of the spaces between filter plates so that the flow of filtrate is into the spaces, thence through the filters, out their peripheral edges and down into the bottom of the tank from whence it is withdrawn.

In another aspect of the invention, the individual plates with their integral spacing means are stacked one on top of the other. A cover having an integral peripheral skirt may be located within the top of the tank such that the lower edge of the skirt rests on the top filter plate near its peripheral edge. The skirt may include a radially outwardly extending flange that supports a resilient gasket, and a loose ring may rest on the gasket and clear the inside wall of the tank as well as the outside wall of the flanged skirt. The cover may be applied to the open end of the tank, and the lower edge of the skirt contacts the top filter plate so that when applying a force to the cover, all of the filter plates are forced together in sealing relation relative to each other against a supporting plate near the bottom of the tank.

In still another aspect of the invention, ears may be provided at equally spaced points about the exterior of the tank at its top for pivotally mounting threaded bars; and brackets may be spaced the same way about the top of the cover having holes for receiving said threaded bars. There may be handwheels on each threaded bar to force the bottom edge of the skirt downwardly against the top filter plate.

In a further aspect of the invention, the lower edge, or gasket contacting edge, of the loose ring may be contoured so as to force the resilient gasket into a more effective sealing relation with the inside wall of the tank.

In a still further aspect of the invention, other brackets may be equally spaced about the top of the cover, and each may support a toggle link arrangement that acts on the top edge of the loose ring to force it into contact with the resilient gasket.

The above, other objects and novel features of the invention will become apparent from the following specification and accompanying drawing which are merely exemplary.

In the drawing:

FIG. 1 is a top plan view of a plate filter to which the principles of the invention have been applied;

FIG. 2 is an elevational view of the filter, parts being broken away to show others;

FIG. 3 is a section taken substantially along line 3—3 of FIG. 1; and

FIG. 4 is an enlarged detail of the ring and gasket action.

Referring to the drawing, the principles of the invention are shown as applied to a large capacity plate filter including a tank 10 supported on legs 11. The tank is generally tub-shaped and open at the top.

A plurality of identical filter plates 12 are stacked, one on top of the other, between each of which a filtering medium 13 is provided. The plates are in the form of inverted saucers or shallow bowls so that a substantial space is provided in each for the accumulation of cake 14.

An inlet pipe 15 is connected to the bottom of tank 10, and it extends upwardly through holes in the filter plates 12, there being seals between the plates and the pipe. The pipe within the tank has apertures that register with the tops of the spaces of the filter plates within which the cake 14 collects, so that the incoming liquid passes into these spaces, thence through the sheet filtering media between adjacent plates, thence radially outward from the periphery of the media.

The filter plates 12 are of less diameter than the inside diameter of the tank 10 so that as the filtrate passes out of the peripheral edges of the filtering media, it gravitates to the bottom of tank 10 from which it is withdrawn through a line 16.

The open end of the tank 10 is adapted to be closed by a cover 17 having a sealing ring or skirt 18 integral therewith. Referring to FIGS. 2 and 3, the skirt 18 rests on top of the top filter plate at its peripheral edge. Ears 19 are equally spaced about, and rigidly secured at the top of tank 10. Each ear pivotally supports a threaded rod 20. There are a plurality of brackets 21 fixed to the top of cover 17, one for each threaded rod 20. The brackets include holes or slots adapted to receive the rods 20, and handwheels 22 are threaded onto the rods 20, bearing against brackets 21 and forcing the skirt 18 of cover 17 into contact with the top filter plate 12, which transmits said force to all others below it, reacting on the support for such plates at the bottom of the interior of tank 10.

Referring to FIG. 3, the top interior of tank 10 is provided with an annular recess 23, and the outside diameter of the cover 17 is substantially less than the diameter of recess 23. A flange 24 extends around the periphery of skirt 18 and is received within recess 23. The flange 24 supports a resilient gasket 25, such as rubber, on its upper face. The construction is such that a ring 26 can fit within the recess 23 with clearance between it, the cover, the outside of skirt 18 above its flange 24, and the wall of recess 23. The lower edge 27 of ring 26 is contoured in a manner to force the gasket 25 into effective sealing relation between the cover and the inside wall of tank 10. In the embodiment disclosed, surface 27 is inclined inwardly in the direction of force applied to ring 26.

A plurality of equally spaced brackets 28 are mounted on the top of cover 17. Each bracket pivotally supports a bifurcated link 29 that includes at its end opposite the pivot a screw 30 that extends between the legs thereof and is held clamped thereto in adjusted position by nuts 31. The lower end of screw 30 includes an anvil 32 adapted to contact the top edge of ring 26.

Another bifurcated link 33 straddles link 29 and is pivoted to the bracket 28. A link 34 is connected to links 33 and 29 such that upon moving the link 33 from its dot-and-dash line position to its solid line position, link 34 forces link 29 downwardly and as the link 33 moves slightly beyond its vertical position (leftwardly, FIG. 3), link 34 passes dead center, locking link 29 in its lower position.

With tank 10 open and filled with a stack of filter plates 12, the cover 17 supporting gasket 25 and ring 26 as a unit is lowered into position so that screws or rods 20 extend through the holes in brackets 21 and such that the lower edge of skirt 18 contacts the outer periphery of the top filter plate. The handwheels 32 on rods 20 are then tightened. Finally, the links 33 or handles are pivoted from their dot-and-dash line position to their solid line position, forcing the ring 26 downwardly, expanding gasket 25 and providing the improved seal for the cover 17.

Although the various features of the improved plate filter and cover sealing means have been shown and described in detail to fully disclose one embodiment of the invention, it will be evident that changes may be made in such details and certain features may be used without others without departing from the principles of the invention.

What is claimed is:

1. In a plate filter, the combination comprising a tank having an open upper end; a stack of filter plates mounted within said tank; means for admitting liquid to be filtered to said tank and into said filter plates; means for withdrawing filtered liquid passing through said plates from said tank; a cover for the open end of said tank including a skirt portion that rests on the top of said stack of filter plates, there being a substantial clearance between the outside of said skirt and the inside of said tank; means on said skirt for accommodating a gasket, and a resilient gasket within said clearance seated on said gasket accommodating means; a ring of a diameter and wall thickness to be freely received within said clearance; means on the top of said cover adapted to cooperate with means on the outer side wall of said tank to force said skirt into contact with the top filter plate; and other means on the top of said cover adapted to engage the top edge of said ring to force its bottom edge into contact with said gasket and to force the gasket against the gasket accommodating means to provide a seal between said ring and the inner wall of said tank.

2. In a plate filter, the combination comprising a tank having an open upper end; a stack of filter plates mounted within said tank; means for admitting liquid to be filtered to said tank and into said filter plates; means for withdrawing filtered liquid passing through said plates from said tank; a cover for the open end of said tank including a skirt portion that rests on the top of said stack of filter plates, there being a substantial clearance between the outside of said skirt and the inside of said tank; a radial flange about the outer periphery of said skirt intermediate its ends; a resilient gasket resting on the top face of said flange; a ring of a diameter and wall thickness to be freely received within said clearance; means on the top of said cover adapted to cooperate with means on the outer side wall of said tank to force said skirt into contact with the top filter plate; and other means on the top of said cover adapted to engage the top edge of said ring to force its bottom edge into contact with said gasket.

3. In a plate filter, the combination comprising a tank having an open upper end; a stack of filter plates mounted within said tank; means for admitting liquid to be filtered to said tank and into said filter plates; means for withdrawing filtered liquid passing through said plates from said tank; a cover for the open end of said tank including a skirt portion that rests on the top of said stack of filter plates, there being a substantial clearance between the outside of said skirt and the inside of said tank; external means on said skirt for accommodating a gasket, and a resilient gasket within said clearance seated on said gasket accommodating means; a ring of a diameter and wall thickness to be freely received within said clearance; means on the top of said cover adapted to cooperate with means on the outer side wall of said tank to force said skirt into contact with the top filter plate; and other means on the top of said cover adapted to engage the top edge of said ring to force its bottom edge into contact with said gasket and to force the gasket against the gasket accommodating means to provide a seal between said ring and the inner wall of said tank, the bottom edge of said ring being contoured to cause said gasket to provide a more effective seal between said ring and the inner wall of said tank.

4. In a plate filter, the combination comprising a tank having an open upper end; a stack of filter plates mounted within said tank; means for admitting liquid to be filtered to said tank and into said filter plates; means for withdrawing filtered liquid passing through said plates from said tank; a cover for the open end of said tank including a skirt portion that rests on the top of said stack of filter plates, there being a substantial clearance between the outside of said skirt and the inside of said tank; a radial flange about the outer periphery of said skirt intermediate its ends; a resilient gasket resting on the top face of said flange; a ring of a diameter and wall thickness to be freely received within said clearance; means on the top of said cover adapted to cooperate with means on the outer side wall of said tank to force said skirt into contact with the top filter plate; and other means on the top of said cover adapted to engage the top edge of said ring to force its bottom edge into contact with said gasket, the bottom edge of said ring being contoured to cause said gasket to provide a more effective seal between said ring and the inner wall of said tank.

5. In a plate filter, the combination comprising a tank having an open upper end; a stack of filter plates mounted within said tank; means for admitting liquid to be filtered to said tank and into said filter plates; means for withdrawing filtered liquid passing through said plates from said tanks; a cover for the open end of said tank including a skirt portion that rests on the top of said stack of filter plates, there being a substantial clearance between the outside of said skirt and the inside of said tank; means on said skirt for accommodating a gasket, and a resilient gasket within said clearance seated on said gasket accommodating means; a ring of a diameter and wall thickness to be freely received within said clearance; means on the top of said cover adapted to cooperate with means on the outer side wall of said tank to force said skirt into contact with the top filter plate; and toggle means on the top of said cover adapted to engage the top edge of said ring to force its bottom edge into contact with said gasket and to force the gasket against the gasket accommodating means to provide a seal between said ring and the inner wall of said tank.

References Cited

UNITED STATES PATENTS

| | | | |
|---|---|---|---|
| 828,320 | 8/1906 | Kiefer | 210—232 |
| 1,710,758 | 4/1929 | Wright | 210—486 X |
| 2,760,642 | 8/1956 | Wallace | 210—450 X |
| 3,141,845 | 7/1964 | Nadherny | 210—344 X |
| 3,235,272 | 2/1966 | Smith | 277—117 X |
| 3,276,587 | 10/1966 | Himeno | 210—345 X |
| 3,206,034 | 9/1965 | Anderson | 210—347 |

OTHER REFERENCES

Niagara Bulletin NBM-6-56, 1956, 4 sheets.

SAMIH N. ZAHARNA, *Primary Examiner.*

REUBEN FRIEDMAN, *Examiner.*

C. DITLOW, *Assistant Examiner.*